(12) United States Patent
Matsui et al.

(10) Patent No.: US 6,273,181 B1
(45) Date of Patent: Aug. 14, 2001

(54) COOLING DEVICE FOR ELECTRONIC PARTS OF VEHICLE

(75) Inventors: Toshinori Matsui, Toyoake; Yukihide Niimi, Chita-gun; Toshiki Kobayashi, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/346,687

(22) Filed: Jul. 2, 1999

(30) Foreign Application Priority Data

Jul. 22, 1998 (JP) .................................................. 10-205979
Dec. 2, 1998 (JP) .................................................. 10-343176

(51) Int. Cl.$^7$ ............................................................ F28F 7/00
(52) U.S. Cl. .......................... 165/46; 165/80.3; 165/185; 257/722; 361/697; 361/709; 361/701
(58) Field of Search .................................. 165/80.3, 80.4, 165/80.5, 104.34, 41, 185; 257/721, 722; 361/696, 697, 701, 702, 703, 707, 709, 710

(56) References Cited

U.S. PATENT DOCUMENTS

| | | | |
|---|---|---|---|
| 3,173,477 | * | 3/1965 | Cuzzone ...................... 165/104.34 X |
| 3,369,597 | * | 2/1968 | Dronsuth et al. ................... 165/80.3 |
| 4,763,224 | * | 8/1988 | Bentz et al. ..................... 165/80.3 X |
| 5,276,584 | * | 1/1994 | Collins et al. ................... 165/80.3 X |
| 5,323,847 | * | 6/1994 | Koizumi et al. ................. 165/80.3 X |
| 5,969,943 | * | 10/1999 | Oyamada ............................ 165/80.3 |
| 6,050,327 | * | 4/2000 | Gates .................................. 165/80.3 |
| 6,104,602 | * | 8/2000 | Morris et al. ................... 165/80.3 X |

FOREIGN PATENT DOCUMENTS

| | | | |
|---|---|---|---|
| 0127825 | * | 5/1989 | (JP) ..................................... 165/80.3 |
| 402118379 | * | 5/1990 | (JP) ................................. 165/104.34 |
| 9-47037 | | 2/1997 | (JP) . |
| 9-207691 | | 8/1997 | (JP) . |

* cited by examiner

Primary Examiner—Christopher Atkinson
(74) Attorney, Agent, or Firm—Nixon & Vanderhye p.c.

(57) ABSTRACT

A case which accommodates electronic control circuit is housed in a housing box. An air passage is formed between the case and a main body of the housing box to introduce cooling air for cooling an electronic control circuit in the case. A heat sink is attached to an inner surface of the case by a screw placed in a through hole formed in an area of the case to which the cooling air is not introduced. Accordingly, the electronic control circuit in the case is prevented from dust, water and the like. Further, the electronic control circuit is efficiently cooled down by the cooling air passes through the air passage via the heat sink and the case because an exothermic electronic element of the electronic control circuit is making a contact with the heat sink.

13 Claims, 5 Drawing Sheets

COOLING DEVICE FOR ELECTRONIC PARTS OF VEHICLE

CROSS REFERENCE TO RELATED APPLICATION

This application is based upon and claims priority from Japanese Patent Application Nos. Hei 10-205979, filed Jul. 22, 1998, and Hei 10-343176, filed Dec. 2, 1998, the entire contents of which are incorporated herein by reference.

BACKGROUND OF THE INVENTION

1. Field of the Invention

The present invention relates to a cooling device for electronic parts of a vehicle, and it is preferably applicable to an electronic element mounted in an engine room of a vehicle.

2. Description of Related Art

One type of known cooling device for electronic parts is disclosed in JP-A-9-207691. The cooling device disclosed in JP-A-9-207691 has a housing box (an electrobox) including a double structure of an inner box portion and an outer box portion. An electronic control unit (an electronic control circuit) is housed in the inner box portion, and cooling air is introduced to a cooling air passage between the inner box portion and the outer box portion to prevent the temperature increase of the electronic control unit.

According to the prior art, the cooling air is not introduced to the electronic control unit directly. Thus, even if the cooling air includes dust, water or the like, the electronic control unit is prevented from them.

However, the cooling performance of the above described prior art may not be sufficient because of the double structure of the housing box. In other words, the cooling air is not directly introduced to the electronic control unit, and such indirect cooling may not be enough to cool the electronic control unit.

SUMMARY OF THE INVENTION

The present invention is made in light of the above-mentioned problem, and it is an object of the present invention to provide a cooling device for electronic parts which improves its cooling performance while preventing dust, water or the like from electric parts.

According to a cooling device of the present invention, a case which accommodates an electronic element is housed in a housing box. An air passage is formed between the case and a main body of the housing box to introduce cooling air for cooling the electronic element in the case. A heat radiation member is attached to an inner surface of the case by a fixing member placed in a through hole formed in an area of the case to which the cooling air is not introduced.

Accordingly, the electronic element in the case is prevented from dust, water and the like. Further, the electronic element is efficiently cooled down by the cooling air passes through the air passage via the heat radiation member and the case because the electronic element makes contact with the heat radiation member.

According to another aspect of the present invention, the heat radiation member is fixed to an inner surface of the case at an area corresponding to the area to which the cooling air is not introduced, and the heat radiation member is extended along the inner surface of the case to an area corresponding to the air passage.

Accordingly, the electronic element is efficiently cooled down by the cooling air passes through the air passage while it is prevented from dust, water and the like.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS (First Embodiment)

A first embodiment of the present invention will now be described according to FIGS. 1 to 4.

Figure 1:
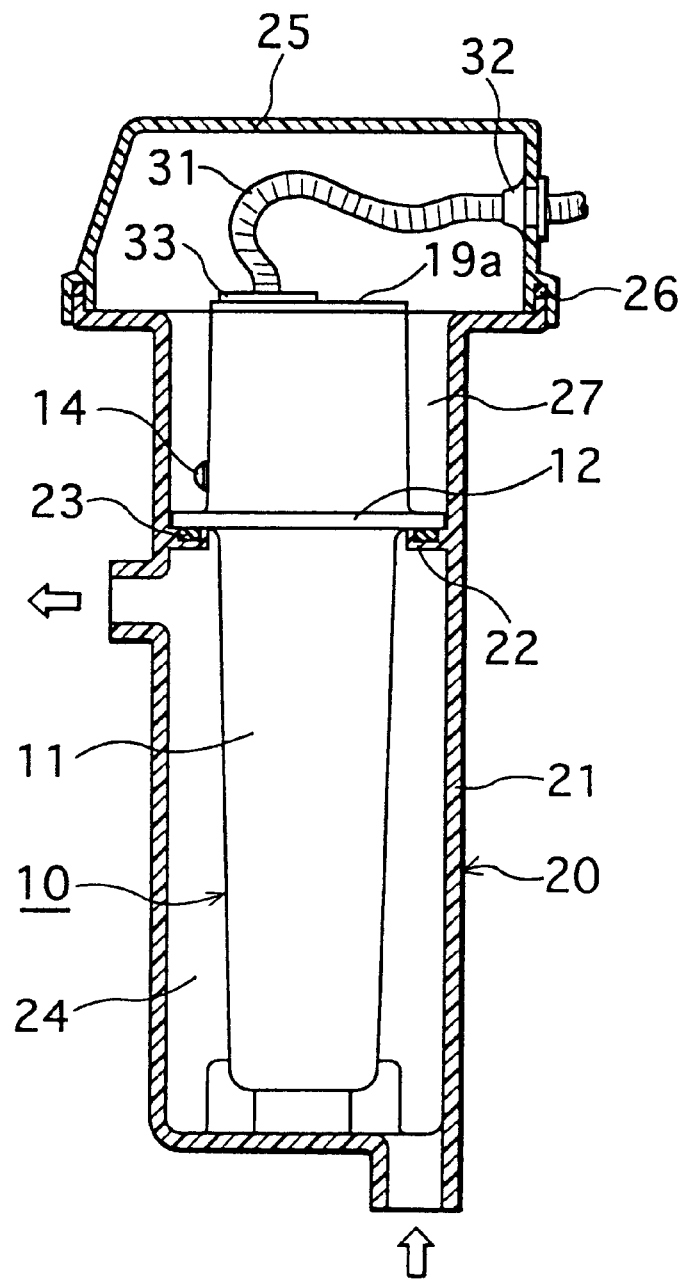
FIG. 1 is a partial sectional view of a housing condition between an electronic control unit and a housing box of a cooling device according to a first and a second embodiments of the present invention.
Figure 2:
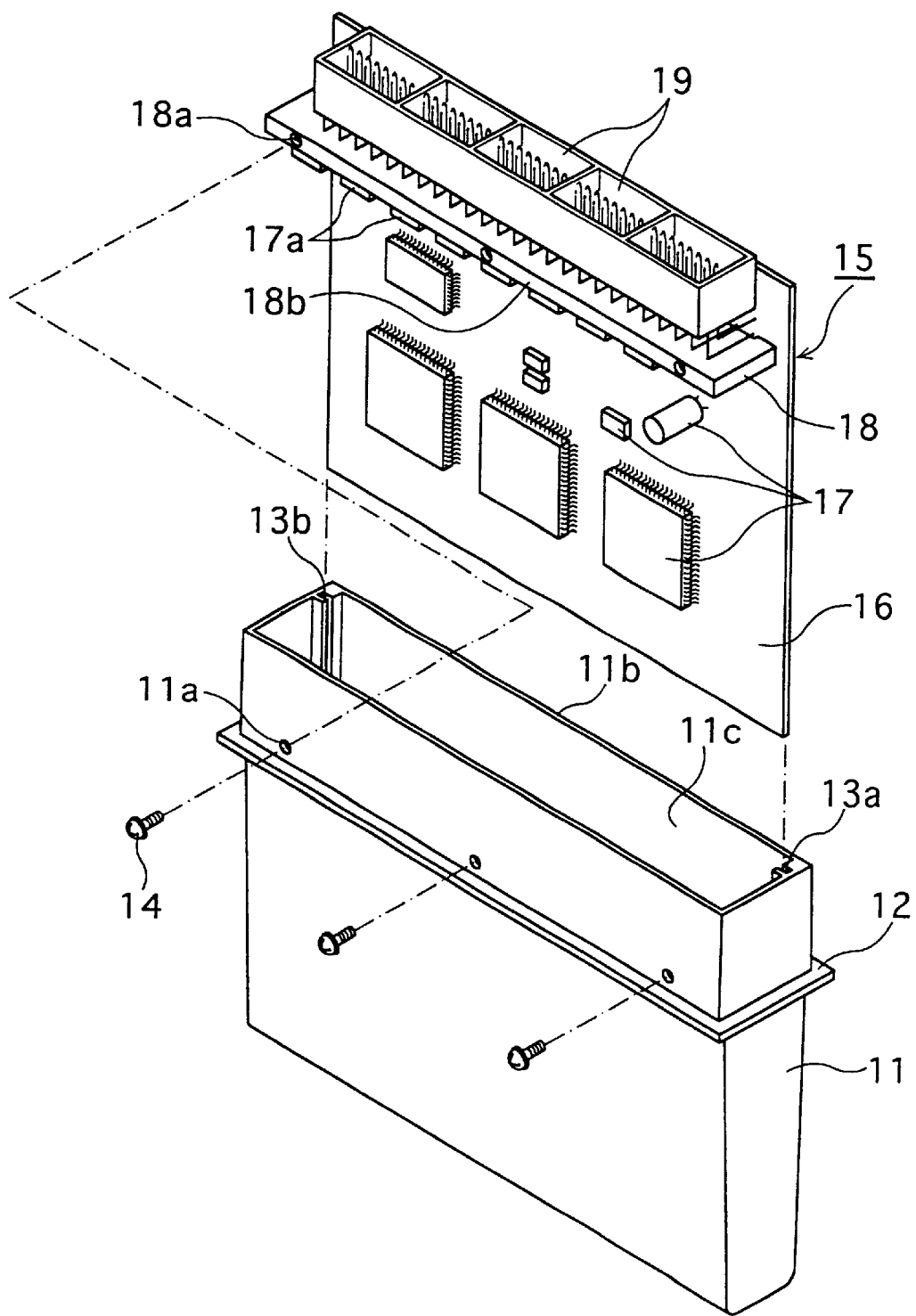
FIG. 2 is an exploded perspective illustration showing main structure at an electronic control unit according to the first embodiment of the present invention.

In FIGS. 1 and 2, an electronic control unit (hereinafter referred to as "ECU") 10 has an approximately rectangular parallelopiped shape, and includes a case 11 made by aluminum die casting and an electronic control circuit 15 housed in the case 11. The electronic control circuit 15 is made of various electronic parts 17 and 17a mounted on a printed circuit board 16.

A flange 12 is formed on an outer surface of the case 11. A housing box 20 is made of a plastic main body 21 for accommodating the ECU 10 and an upper plastic lid 25. The main body 21 and the upper lid 25 are sealed via a seal packing 26.

A wiring harness 31 penetrates the upper lid 25 with seal via a wiring harness grommet 32 made of rubber. A connector 33 at the tip of the wiring harness 31 is connected to an outer connector 19 at an upper portion of ECU 10. A plastic case lid 19a is formed to cover the outer connector 19 located at an opening portion 11b of the case 11. The plastic case lid 19a is omitted from FIG. 2.

The main body 21 of the housing box 20 accommodates the case 11 of ECU 10. The flange 12 formed on the outer surface of the case 11 is fitted to a flange 22 formed on an inner surface of the main body 21 via a seal packing 23. The case 11 and the main body 21 are fixed by a screw (not shown) at a place upper than the flange 12.

Accordingly, an air passage 24, having a waterproof mechanism between the outer surface of the case 11 and the inner surface of the main body 21, is formed to cool ECU 10. Further, an isolated area 27, which is not exposed to the cooling air, is formed in the upper lid 25 isolated from the air passage 24 by the flanges 12 and 22.

Figure 3:
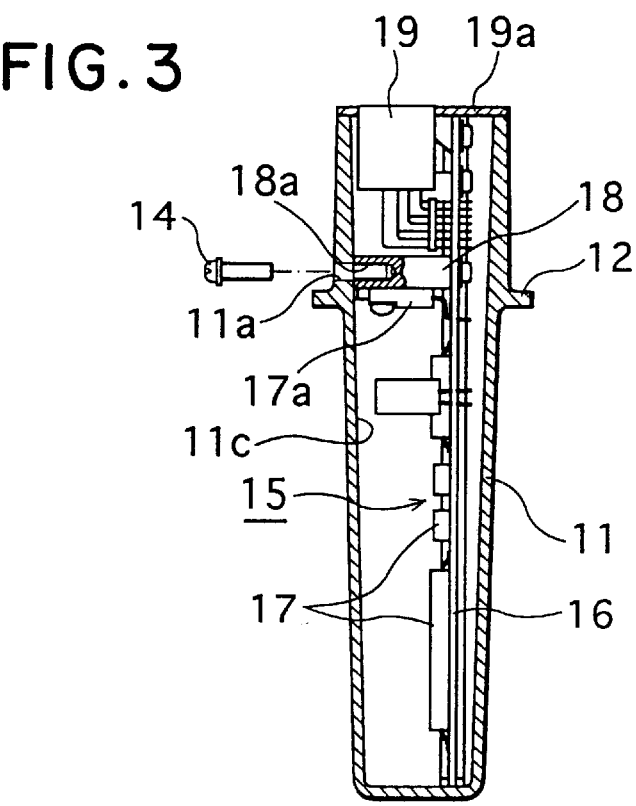
FIG. 3 is a sectional view showing a fixation of the electronic element to a case according to the first embodiment of the present invention.

As shown in FIGS. 2 and 3, various electronic parts 17, 17a are mounted on the printed circuit board 16.

Among these electronic parts 17 and 17a, the exothermic electronic elements 17a are fixed by a screw, adhesive or the like to a heat sink 18 which is made of aluminum plate having a good heat radiation performance. The heat sink 18 is screwed on the printed circuit board 16. Further, the outer connector 19 is soldered on the printed circuit board 16.

The printed circuit board 16 is inserted to slit grooves 13a and 13b. The heat sink 18 is screwed and fixed on the case 11 by a screw 14 through the tapped hole 18a and a through hole 11a formed on the isolated area 27.

An cooling operation of the first embodiment will now be described according to FIGS. 1 to 3.

The housing box 20 accommodating ECU 10 is mounted on the engine room of a vehicle (not shown). The cooling air flows in the direction shown by arrows in FIG. 1 because the outer air flowing beneath the vehicle is introduced by a duct or the like from beneath the main body 21 to the air passage 24. The cooling air in the air passage 24 is compulsorily discharged from the side portion of the main body 21 via a duct or the like by utilizing negative pressure generated adjacent to a front side of a cooling fan for a radiator.

Accordingly, the outer surface of the case 11 of ECU 10 housed in the housing box 20 is cooled, and the electronic control circuit 15 housed in the case 11 is also cooled. Thus, the electronic control circuit 15, especially among them, the exothermic electronic elements 17a are efficiently cooled via the heat sink 18 which is adhered to the inner surface 11c of the case 11.

According to the first embodiment of the present invention, the air passage 24 for cooling ECU 10 is formed between the case 11 and the main body 21. Furthermore, the heat sink 18 is fixed with a contact to the inner surface 11c of the case 11 by the screw 14 through the through hole 11a formed in the isolated area 27. Thus, the electronic control circuit 15 in the case 11 is prevented from dust, water and the like even if the cooling air includes them.

According to the first embodiment of the present invention, the exothermic electronic parts 17a are kept in full contact with the heat sink 18. Thus, when the electronic parts 17 and 17a are cooled via the case 11 by the cooling air which flows through the air passage 24, the exothermic electronic parts 17a are efficiently cooled via the heat sink 18 and the case 11. Accordingly, the temperature increase of the electronic circuit 15 in the case 11 of ECU 10 mounted on the engine room of the vehicle is prevented.

Furthermore, according to the first embodiment of the present invention, the air passage 24 for introducing the cooling air to cool the electronic control circuit 15 and the isolated area 27 are divided by the flanges 12 and 22, and the heat sink 18 is fixed in the isolated area 27 adjacent to the flange 12.

Since the cooling air is not introduced to the isolated area 27, the electronic control circuit 15 in the case 11 is prevented from dust, water and the like even if the cooling air includes them.

Further, since the heat sink 18 is adjacent to the flange 12, that is adjacent to the air passage 24, the exothermic electronic parts 17a are efficiently cooled via the heat sink 18 and the case 11.

Figure 4:
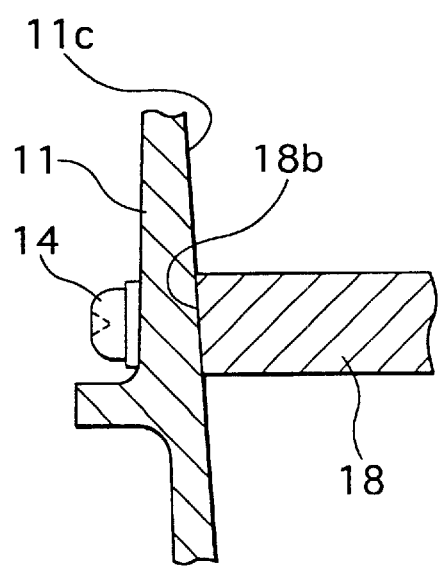
FIG. 4 is a part of an enlarged sectional view showing a fixation of the case and a heat sink according to the first embodiment of the present invention.

FIG. 4 is a part of an enlarged sectional view showing a fixation of the case 11 and the heat sink 18 according to the first embodiment of the present invention. As shown in FIGS. 3 and 4, the inner surface 11c has a predetermined draft angle when the case 11 is produced by aluminum die casting. As a result, the inner surface 11c is tapered.

A fixing surface 18b of the heat sink 18 to be fixed on the inner surface 11c of the case 11 has the same draft angle such that the fixing surface 18b fits to the inner surface 11c as shown in FIG. 4.

Accordingly, when the heat sink 18 is fixed to the inner surface 11c at the fixing surface 18b with the screw 14, the surface contact is secured and irrational force is prevented from the heat sink 18. Therefore, the exothermic electronic parts 17a are efficiently cooled via the heat sink 18 and the case 11 because of the efficient heat transfer.

Furthermore, since distortion at the printed circuit board 16 is prevented via the heat sink 18, damage, such as a crack on the electronic parts 17 and 17a or circuit pattern, is prevented.

A modification of the first embodiment of the present invention will now be described according to FIG. 5.

Figure 5:
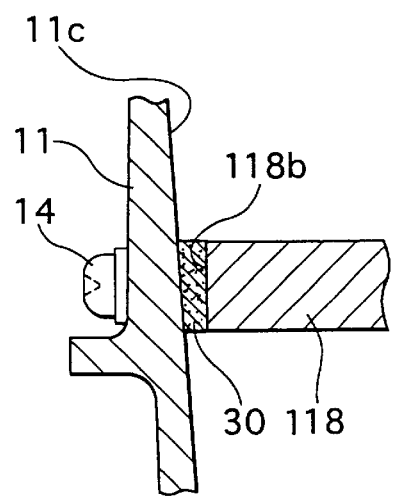
FIG. 5 is a part of an enlarged sectional view showing a fixation of a case and a heat sink according to a modification of the first embodiment of the present invention.

In this modification, a fixing surface 118b of a heat sink 118 does not have the draft angle as shown in FIG. 5. Instead, a heat conduction sheet 30 is provided between the inner surface 11c and the fixing surface 18b when they are fixed with the screw 14. The heat conduction sheet 30 is made of a flexible material, such as heat conductive silicon or heat conductive silicon including glass fiber. For example, heat conductive silicon or heat conductive silicon including glass fiber are spliced to form a sheet having an adhesive layer on one side, and it has approximately rectangular parallelopiped shape.

When a thickness of the flexible heat conduction sheet 30 is determined, the amount of change in size caused by the elastic deformation is taken into consideration. Thus, the height of the fixing surface 118b from the surface of the printed circuit board 16 is determined, and the flexible heat conduction sheet 30 is sandwiched between the inner surface 11c and the fixing surface 118b such that it elastically deforms to fit to the inner surface 11c and the fixing surface 118b.

All features other than the one described above are the same as those in the first embodiment.

According to the modification of the first embodiment, irrational force is prevented from the heat sink 118. Therefore, the exothermic electronic parts 17a are efficiently cooled via the heat sink 118, the heat conduction sheet 30 and the case 11 because of the efficient heat transfer.

Furthermore, since distortion at the printed circuit board 16 is prevented via the heat sink 118, damage, such as a crack on the electronic parts 17 and 17a or circuit pattern, is prevented.

(Second Embodiment)

A second embodiment of the present invention will now be described according to FIGS. 1, 6, 7 and 8.

In this embodiments, components which are substantially the same as those in the first embodiment are assigned the same reference numerals.

Figure 7:
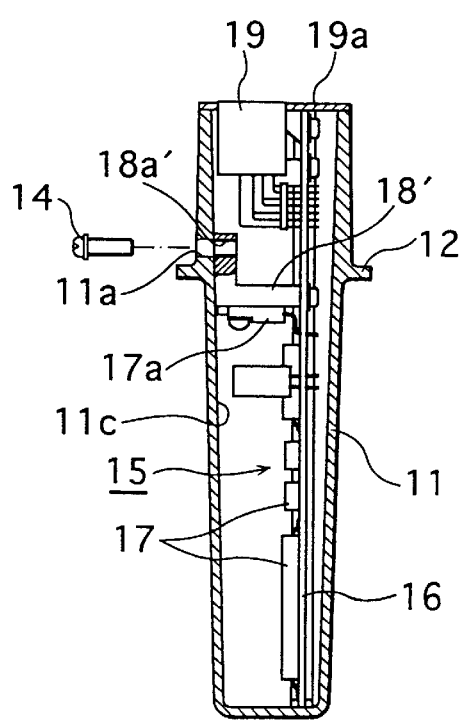
FIG. 7 is a sectional view showing a fixation of the electronic element to a case according to the second embodiment of the present invention.
Figure 6:
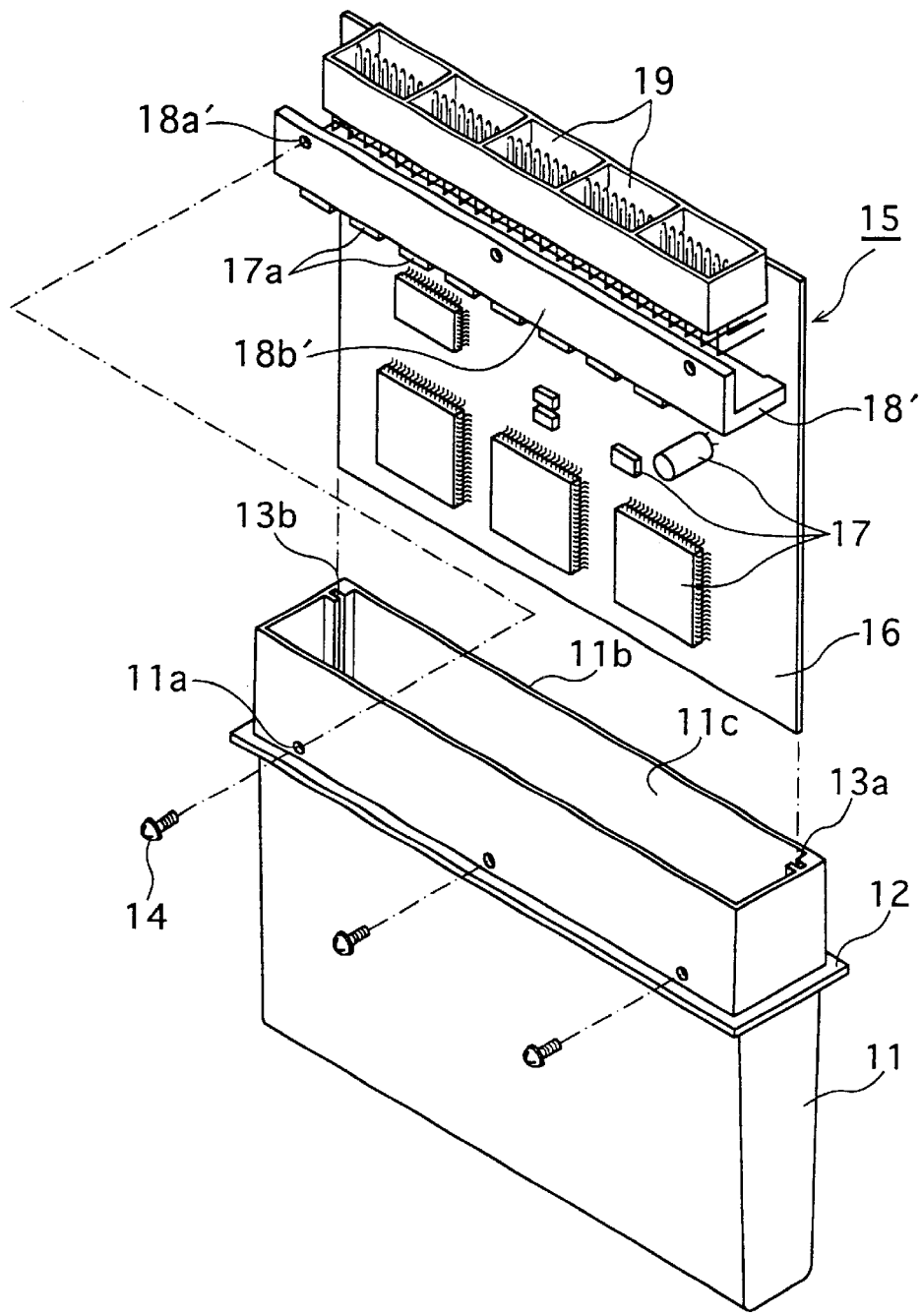
FIG. 6 is an exploded perspective illustration showing main structure at an electronic control unit according to the second embodiment of the present invention.

As shown in FIGS. 6 and 7, the shape of L-shaped heat sink 18' is different from that of the heat sink 18 in the first embodiment. The fixation between the heat sink 18' and the inner surface 11c of the case 11 is executed in the isolated area 27, and the fixation between the heat sink 18' and the printed circuit board 16 is executed at the inner surface 11c to be cooled by the cooling air beneath the flange 12.

According to the second embodiment of the present invention, the cooling air is prevented from the through hole 11a, and the electronic control circuit 15 in the case 11 is prevented from dust, water and the like included in the cooling air.

Furthermore, the exothermic electronic parts 17a fitted with the heat sink 18' is efficiently cooled down because the heat sink 18' is extended to the inner surface 11c to be cooled by the cooling air.

In the second embodiment, it may be desirable to maximize the contacting area between the heat sink 18' and the inner surface 11c to improve the heat radiation performance by extending the longitudinal portion of the heat sink 18' along the inner surface 11c of the case 11.

Figure 8:
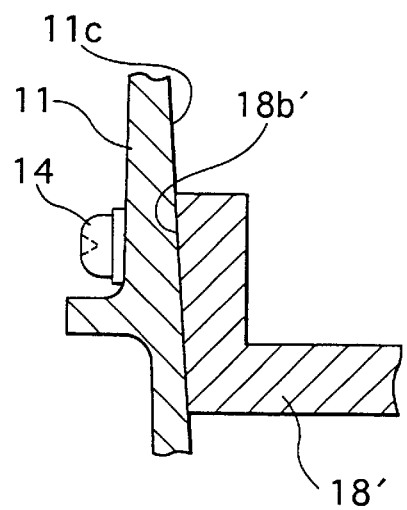
FIG. 8 is a part of an enlarged sectional view showing a fixation of the case and a heat sink according to the second embodiment of the present invention.

FIG. 8 is a part of an enlarged sectional view showing a fixation of the case 11 and the heat sink 18' according to the second embodiment of the present invention. As shown in FIGS. 7 and 8, the inner surface 11c has a predetermined draft angle when the case 11 is produced by aluminum die casting. As a result, the inner surface 11c is tapered.

A fixing surface 18b' of the heat sink 18' to be fixed on the inner surface 11c of the case 11 has the same draft angle such that the fixing surface 18b' fits to the inner surface 11c as shown in FIG. 8.

Accordingly, when the heat sink 18' is fixed to the inner surface 11c at the fixing surface 18b' with the screw 14, the surface contact is secured and irrational force is prevented from the heat sink 18'. Therefore, the exothermic electronic parts 17a are efficiently cooled down via the heat sink 18' and the case 11 because of the efficient heat transfer.

Furthermore, since distortion at the printed circuit board 16 is prevented via the heat sink 18', damage, such as a crack on the electronic parts 17 and 17a or circuit pattern, is prevented.

Figure 9:
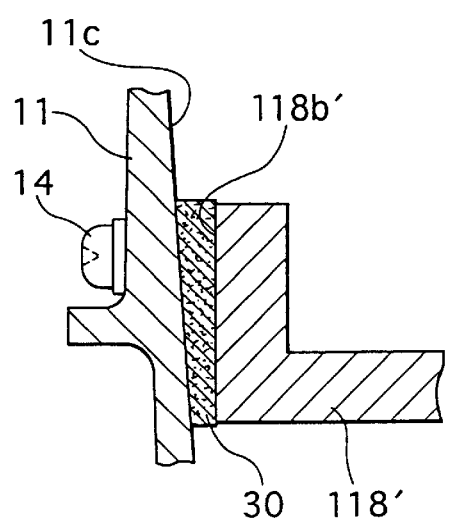
FIG. 9 is a part of an enlarged sectional view showing a fixation of a case and a heat sink according to a modification of the second embodiment of the present invention.

A modification of the second embodiment of the present invention will now be described according to FIG. 9.

In this modification, a fixing surface 118b' of a heat sink 118' does not have the draft angle as shown in FIG. 8. Instead, a heat conduction sheet 30 is provided between the inner surface 11c and the fixing surface 118b' when they are fixed with the screw 14. The heat conduction sheet 30 is made of a flexible material, such as heat conductive silicon or heat conductive silicon including glass fiber. For example, heat conductive silicon or heat conductive silicon including glass fiber are spliced to form a sheet having an adhesive layer on one side, and it has approximately rectangular parallelopiped shape.

When a thickness of the flexible heat conduction sheet 30 is determined, the amount of change in size caused by the elastic deformation is taken into consideration. Thus, the height of the fixing surface 118b' from the surface of the printed circuit board 16 is determined, and the flexible heat conduction sheet 30 is sandwiched between the inner surface 11c and the fixing surface 118b' such that it elastically deforms to fit to the inner surface 11c and the fixing surface 118b'.

All features other than the one described above are the same as those in the second embodiment.

According to the modification of the second embodiment, irrational force is prevented from the heat sink 118'. Therefore, the exothermic electronic parts 17a are efficiently cooled via the heat sink 118', the heat conduction sheet 30 and the case 11 because of the efficient heat transfer.

Furthermore, since distortion at the printed circuit board 16 is prevented via the heat sink 118', damage, such as a crack on the electronic parts 17 and 17a or circuit pattern, is prevented.

In the above described embodiments, another fixing member, such as a rivet, may be used to fix the heat sink 18 (18', 118, 118') instead of the screw 14.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A cooling device for an electronic element comprising:
   a case accommodating the electronic element therein;
   a housing accommodating said case therein;
   a heat radiation member fitted to the electronic element for radiating heat generated by the electronic element;
   an air passage defined by an outer surface of said case and an inner surface of said housing for introducing cooling air to cool said electronic element; and
   a fixing member for fixing said heat radiation member to said case, wherein
   said housing includes an isolated area defined by said outer surface of said case and said inner surface of said housing, and isolated from said air passage to prevent said cooling air from being directly introduced into said isolated area;
   said case includes at least one through hole formed in said isolated area; and
   said heat radiation member is fixed to said case in an area of said isolated area by said fixing member located at said through hole.

2. A cooling device for an electronic element as in claim 1, wherein
   said air passage and said isolated area are isolated from each other by a flange formed on at least one of said inner surface of said housing and said outer surface of said case; and
   said heat radiation member is fixed by said fixing member at a place adjacent to said flange in said isolated area.

3. A cooling device for an electronic element as in claim 1, wherein
   said heat radiation member is fixed to an inner surface of said case at an area corresponding to said isolated area; and
   said heat radiation member is extended along said inner surface of said case to an area corresponding to said air passage.

4. A cooling device for an electronic element as in claim 1, wherein said heat radiation member includes a tapered fixing surface to be fitted to an inner surface of said case.

5. A cooling device for an electronic element as in claim 1, wherein said cooling device includes a flexible heat conduction member provided between said heat radiation member and an inner surface of said case.

6. A cooling device for an electronic element as in claim 1, wherein said cooling device is located in an engine room of a vehicle.

7. A cooling device for an electronic element as in claim 1, wherein said isolated area is waterproofed from said air passage.

8. A cooling device for an electronic element comprising:
   a case accommodating the electronic element therein;
   a housing accommodating said case therein;
   a heat radiation member fitted to the electronic element for radiating heat generated by the electronic element;
   an air passage defined by an outer surface of said case and an inner surface of said housing for introducing cooling air to cool said electronic element; and a fixing member for fixing said heat radiation member to said case, wherein said housing includes an isolated area defined by said outer surface of said case and said inner surface of said housing, and isolated from said air passage to prevent said cooling air from being directly introduced into said isolated area;

said case includes at least one through hole formed in said isolated area;

said heat radiation member is fixed to said case by said fixing member located at said through hole;

said case is a bottom-closed rectangular pipe having an opening thereon;

a flange for isolating said isolated area from said air passage is formed on an outer periphery, adjacent to said opening, of said outer surface of said case; and said heat radiation member is fixed to said case at a place adjacent to said flange in said isolated area.

9. A cooling device for an electronic element comprising:

a case accommodating the electronic element therein;

a housing accommodating said case therein;

a heat radiation member contacting the electronic element for radiating heat generated by the electronic element;

a separation wall provided between an outer surface of said case and an inner surface of said housing to define a first area and a second area separated from each other, said first area and said second area being formed between said housing and said case; and a fixing member for fixing said heat radiation member to an inner surface of said case at an area of said first area, said fixing member being located in said first area, wherein said first area is separated from said second area so that said first area and said second area are waterproofed from each other; and cooling air for cooling down the electronic element passes through only said second area.

10. A cooling device for an electronic element comprising:

a case accommodating the electronic element therein;

a housing accommodating said case therein;

a heat radiation member contacting the electronic element for radiating heat generated by the electronic element;

a separation wall provided between an outer surface of said case and an inner surface of said housing to define a first area and a second area separated from each other, said first area and said second area being formed between said housing and said case; and a fixing member for fixing said heat radiation member to an inner surface of said case, said fixing member being located in said first area, wherein said first area is separated from said second area so that said first area and said second area are waterproofed from each other;

cooling air for cooling down the electronic element passes through only said second area;

wherein said separation wall includes a flange formed on at least one of said inner surface of said housing and said outer surface of said case; and said heat radiation member is fixed by said fixing member at a place adjacent to said flange in said first area.

11. A cooling device for an electronic element as in claim 9, wherein;

said flange includes a first flange formed on said inner surface of said housing and a second flange formed on said outer surface of said case; and said cooling device includes a waterproof seal member provided between said first flange and said second flange.

12. A cooling device for an electronic element comprising:

a case accommodating the electronic element therein;

a housing accommodating said case therein;

a heat radiation member contacting the electronic element for radiating heat generated by the electronic element;

a separation wall provided between an outer surface of said case and an inner surface of said housing to define a first area and a second area separated from each other, said first area and said second area being formed between said housing and said case; and a fixing member for fixing said heat radiation member to an inner surface of said case, said fixing member being located in said first area, wherein said first area is separated from said second area so that said first area and said second area are waterproofed from each other;

cooling air for cooling down the electronic element passes through only said second area;

said case is a bottom-closed rectangular pipe having an opening thereon;

a flange for separating said first area from said second area is formed on an outer periphery, adjacent to said opening, of said outer surface of said case so that said first and second areas are waterproofed from each other; and said heat radiation member is fixed to said case at a place adjacent to said flange in said first area.

13. A cooling device for an electronic element as in claim 12, wherein;

said flange includes a first flange formed on said inner surface of said housing and a second flange formed on said outer surface of said case; and said cooling device includes a waterproof seal member provided between said first flange and said second flange.

* * * * *